United States Patent Office 3,143,799
Patented Aug. 11, 1964

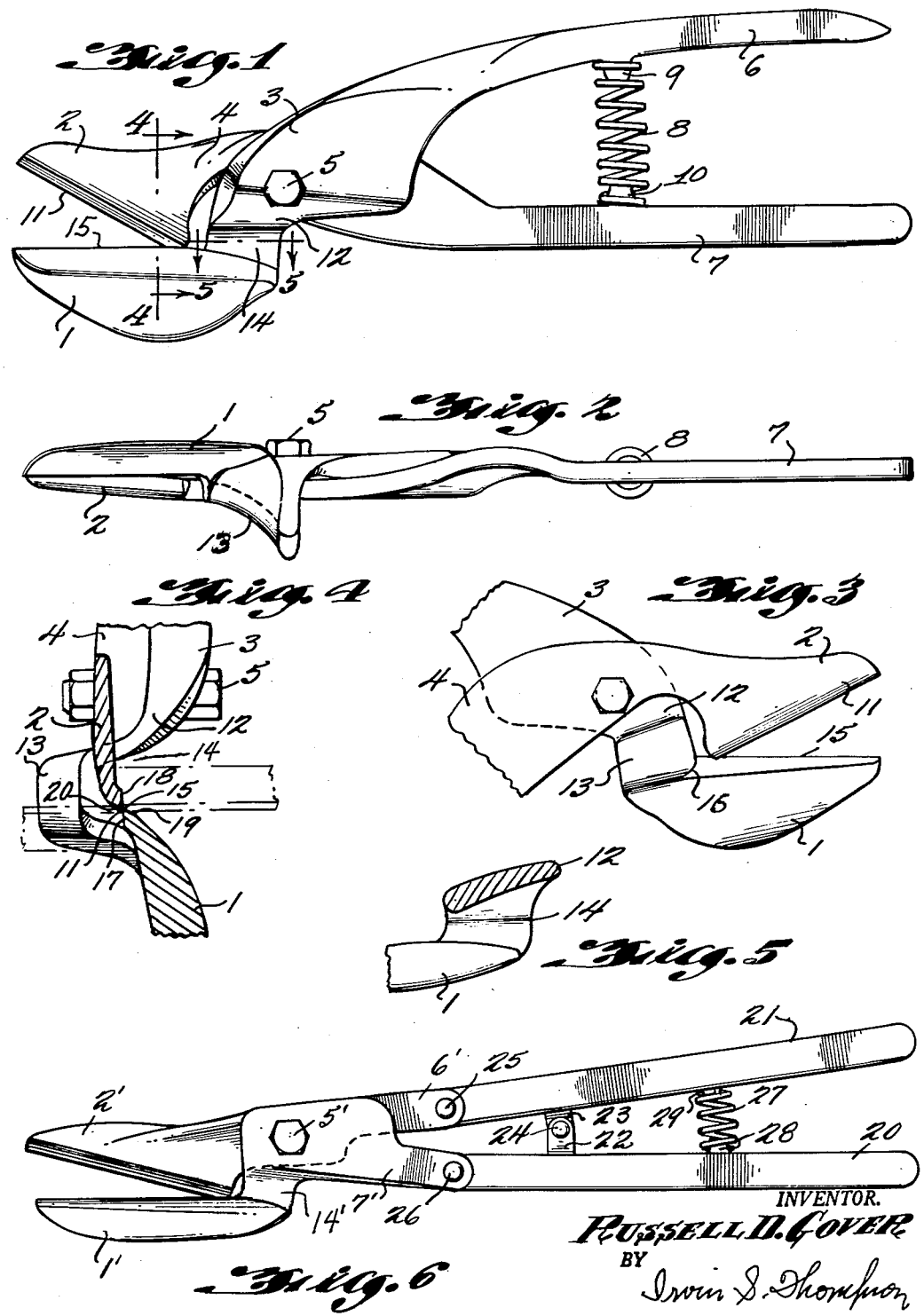

3,143,799
HAND SHEARS
Russell D. Gover, 97 Wise Ave., Baltimore 22, Md., assignor of one-third to John K. Smith, Dundalk, Md., and one-third to Matilda M. Wilson, Baltimore, Md.
Filed July 23, 1962, Ser. No. 211,739
5 Claims. (Cl. 30—259)

This invention relates in general to hand tools and more particularly has reference to shears or snips for cutting sheet material such as sheet metal, plastic and other substances or combinations in sheet form.

While hand shears of various types for cutting sheet material such as metal have been in use for many years and many improvements have been made therein, when a cut is made the severed strip or both the severed strip and the sheet being cut must be deflected or curled out of the plane of the sheet being cut to enable the shears to continue to cut. This makes it difficult and practically impossible to cut formed sheets of material such as corrugated sheets or sheets having angular flanges without deforming or damaging the main sheet or the portion cut therefrom. Furthermore, it is practically impossible to cut sheet material that is brittle because the deflection between the sheet and the portion severed therefrom it too great to avoid breakage. An attempt has been made to solve the problem wherein one blade member of the shears has a groove or cut away portion formed therein and aligned with the cutting edge thereof to allow the edge of the main sheet or of the severed strip to pass therethrough.

It has been found, however, that shears so constructed are useful only for performing straight cuts and that any deviation from a straight cut is practically impossible. Furthermore, this feature alone does not solve the problem because the groove or cut away portion permits only the sheet from which the strip is severed to remain in its plane and the severed strip still must be deflected considerably out of the plane of the sheet being cut.

The principal object of this invention is to provide hand shears capable of cutting formed sheets of material that avoid the disadvantages of the prior art.

Another object of this invention is to provide hand shears capable of cutting formed sheets of material in straight lines or lines curved either to the right or left of a straight line with a clean cut and without deforming or damaging the sheet cut or the portion cut therefrom.

A further object of this invention is to provide hand shears having a pair of pivoted blades, the actuating means or handles of which are disposed to lie above (or when inverted, below) or at least outside of the plane of the sheet of material to be cut and wherein the pivot connecting the blades or members carrying the blades is disposed above or below the plane of the sheet to be cut, one of said blades carrying members having an offset portion providing a channel-like recess or groove to receive the cut edge of the sheet or the portion cut therefrom.

Still another object of this invention is to provide hand shears which are simple in construction, easy to use and effective for cutting all types of sheet material regardless of whether the sheets are plain, corrugated or otherwise formed.

A still further object of this invention is to provide hand shears which are capable of cutting plastic material, even brittle material.

With these and other objects in view as will become apparent from the following description, the invention resides in the parts and combinations herein described and illustrated in the drawings, in which:

FIG. 1 is a side elevational view of shears constructed in accordance with the present invention;
FIG. 2 is a bottom view of the shears shown in FIG. 1;
FIG. 3 is a detailed fragmentary view of the shears of FIG. 1, illustrating the opposite side thereof;
FIG. 4 is a sectional view taken on line 4—4 of FIG. 1;
FIG. 5 is a detailed sectional view taken on line 5—5 of FIG. 1;
FIG. 6 is a view similar to FIG. 1 of a modified form of shears wherein a pivoted linkage is associated with the actuating means of the pivoted blade carrying members to increase the mechanical advantage in favor of the operator.

As shown in FIGS. 1–5 of the drawings, the shears of this invention comprise a pair of blades 1 and 2 carried by blade carrying members 3 and 4 which are pivotally connected together by a pivot bolt 5. The carrying member 3 of blade 1 is provided with actuating means in the form of a handle 6 and the carrying member 4 of blade 2 is provided with an actuating means or handle 7. In the particular embodiment of the invention shown in FIGS. 1–5, a compression spring 8 engaging lugs 9 and 10 on handles 6 and 7 respectively is provided to urge the handles and the blades apart.

Upper blade 2 and its carrying member 4 are constructed in a manner such that the cutting edge 11 thereof and in some instances even the upper edge thereof are disposed well below the pivot 5 when the shears are held in position to cut a horizontal sheet of material so that when in such position the pivot 5 will be well above the plane of the sheet to be cut.

Handle or actuating arm 7 of the upper blade 2 is so formed with respect to blade 2 that said handle 7 will be disposed above the plane of a horizontal sheet being cut.

The carrying member 3 of lower blade 1 as shown in FIG. 1 has an upper portion through which the pivot bolt 5 passes. Blade 1 is connected to its carrying member 3 by means of an intermediate portion 12. As shown in the drawings and in particular in FIGS. 2 and 4, the intermediate portion 12 of blade 1 is provided with a lateral offset 13 which has a channel-like recess or groove 14 in the opposite side thereof. Recess or groove 14 is flared to increase in dimension vertically from its forward portion to its rear portion as shown in FIG. 1 and as shown in FIG. 2 the recess or groove 14 more appreciably increases laterally (in depth) from its forward portion to its rear portion. While the flare of groove 14 as shown by dotted line in FIG. 2 is on a curve, said flare may be defined by a straight line.

Depending upon the use to be made of the shears, the angularity of the lateral flare of groove 14 relative to the cutting edge 15 of jaw 1 may vary from a few degrees to as much as 45° or even more in certain special cases. To provide the widely flared groove 14 the offset 13 is correspondingly flared as illustrated in FIG. 2.

It should be noted that the cutting edge 15 of blade 1 terminates at the forward edge of the offset 13 and that a line projecting rearwardly from cutting edge 15 and in alignment with said cutting edge appears to pass intermediate the upper and lower walls of recess or groove 14. FIG. 2 however shows that even at its forward portion, recess or groove 14 is offset laterally from a line in alignment with cutting edge 15. This lateral offset of the groove or recess is of practical importance and in a small pair of shears should be at least 1/16 of an inch to allow cutting on curved lines.

Referring to FIG. 3, it will be noted that the carrying member 4 of upper blade 2 is cut away rearwardly of the cutting edge 11 of blade 2 to clear the offset 13 as the blades are moved together.

The thickness of the intermediate portion 12 at the offset 13 is made as small as possible particularly at the juncture with the lower blade 1 because the thinner this portion is the less displacement is required between the severed part of the sheet and the remaining part of the sheet to be cut. Since the force applied to the actuating means or handle is transmitted to the blade 1 through the intermediate portion 12 and offset 13, it is necessary that it be heavy enough to transmit said force. In this connection, the material of which at least this portion is made should be chosen to enable it to be as thin as possible.

Referring to FIG. 3, it will be noted that the lower forward portion of offset 13 is tapered and rounded as indicated by reference numeral 16 to facilitate the passage of one portion of the severed material thereunder while the other portion passes through the recess or groove 14.

The cutting edges 15 and 11 are formed at the juncture of bearing surfaces 17 and 18 and ground edges 19 and 20 respectively as shown in FIG. 4. As illustrated, the bearing surfaces are part of the inner surfaces of the blades or are formed thereon.

From the foregoing it will be apparent that when cutting a sheet of material that one portion will pass under the offset 13 and the other portion will pass through the recess or groove 14 and that due to the thinness of the lower portion of the offset 13 at the juncture with the lower blade 1 the deflection between the severed portion and the remainder of the sheet out of the plane of the sheet is much smaller than with hand shears of the various types heretofore developed and used. This small deflection out of the plane of the sheet being cut makes it possible to use the shears of this invention to cut corrugated or otherwise formed sheets, e.g., sheets having flanges or other formations close to the line of cut.

Further, due to the lateral flare of the offset 13 and corresponding recess or groove 14, it is possible with the shears of this invention to cut curves of very small radii either to the right or to the left of a straight line. The height or vertical dimension of groove 14 as shown in FIG. 1 is made great enough to accommodate material of a thickness that can be cut by the shears.

When the shears are to be used for cutting relatively thick and/or tough material, the shears may be constructed to be operated by a linkage giving the operator a mechanical advantage as shown in FIG. 6 of the drawings.

The shears of FIG. 6 are constructed slightly differently from those of FIGS. 1–5 in that the short handles 6' of blade 1' and 7' of blade 2' are positioned so that the handles are spread apart to close the blades whereas in FIGS. 1–5 the handles are moved towards each other to close the blades. This makes it possible to utilize a simple linkage comprising levers 20 and 21 having lugs 22 and 23 connected to pivot 24. Lever 20 is pivotally connected by pivot 25 to the end of handle 6' and lever 21 is similarly pivoted to the end of handle 7' by pivot 26. A spring 27 cooperating with lugs 28 and 29 on levers 20 and 21 serves to move the levers to a position to open jaws 1' and 2'.

Apart from the above-pointed out differences, the blades 1' and 2' are constructed to include the novel features of FIGS. 1–5 so that the shears will have the characteristics hereinbefore described.

From the foregoing it will be realized that the present invention provides hand shears having many advantages over the prior art devices and which will enable the shears to be used to make cuts in formed and molded sheets heretofore considered impractical, if not impossible.

Having described my invention, I claim:

1. Shears comprising a lower shear blade having inner and outer side surfaces and a shear cutting edge formed on the upper forward portion of the blade at the juncture with the inner side surface thereof, a blade carrying member fixed to the inner side of the blade rearwardly of said cutting edge and extending upwardly from said blade, an upper shear blade having inner and outer side surfaces and a shear cutting edge formed on the lower forward portion of the blade at the juncture with the inner side surface thereof, a blade carrying member fixed to the upper blade rearwardly of its cutting edge and extending upwardly therefrom, a pivot pivotally connecting the blade carrying members together at a position rearwardly of and above the cutting edges of both blades with the inner surfaces of said blades facing each other and with their cutting edges disposed in cooperating shearing relation, the blade carrying member of the lower blade having an offset portion projecting laterally from the inner surface of the blade defining a channel-like recess in the outer side thereof extending rearwardly from the cutting edge with the forward portion of the recess spaced laterally inwardly from the cutting edge of the lower blade and with the depth of the recess increasing rearwardly of the blade, and actuating means on the blade carrying members.

2. Shears according to claim 1 wherein the channel-like recess formed in the offset portion of the carrying member of the lower blade is flared laterally and rearwardly along a curve.

3. Shears according to claim 1 wherein the lower wall of the channel-like recess is flared downwardly and rearwardly.

4. Shears according to claim 1 wherein the thickness of the part of the offset portion of the lower blade carrying member that defines the lower portion of the channel-like recess is at a minimum to reduce the deflection of a strip sheared from a body of material.

5. Shears comprising a lower shear blade having inner and outer side surfaces and a shear cutting edge formed on the upper forward portion of the blade at the juncture with the inner side surface thereof, a blade carrying member fixed to the inner side of the blade rearwardly of said cutting edge and extending upwardly from said blade, an upper shear blade having inner and outer side surfaces and a shear cutting edge formed on the lower forward portion of the blade at the juncture with the inner side surface thereof, a blade carrying member fixed to the upper blade rearwardly of its cutting edge and extending upwardly therefrom, a pivot pivotally connecting the blade carrying members together at a position rearwardly of and above the cutting edges of both blades with the inner surfaces of said blades facing each other and with their cutting edges disposed in cooperating shearing relation, the blade carrying member of the lower blade having an offset portion projecting laterally from the inner surface of the blade defining a channel-like recess in the outer side thereof extending rearwardly from the cutting edge with the forward portion of the recess spaced laterally inwardly from the cutting edge of the lower blade and with the depth of the recess increasing rearwardly of the blade, the thickness of the part of the offset portion of the lower blade carrying member that defines the lower portion of the channel-like recess being at a minimum to reduce the deflection of a strip sheared from a body of material, the under surface of the part of the offset portion of the lower blade carrying member that defines the lower portion of the channel-like recess being shaped to correspond to the channel-like recess and the rear portion of the blade being of reduced thickness so that the inner surface thereof appears to be flared towards the outer surface of said blade, and actuating means on the blade carrying members.

References Cited in the file of this patent

UNITED STATES PATENTS

| | | |
|---|---|---|
| 540,464 | Stockman | June 4, 1895 |
| 828,110 | Hancock | Aug. 7, 1906 |
| 1,446,540 | Bernard | Feb. 27, 1923 |
| 1,594,671 | Isaac | Aug. 3, 1926 |
| 2,356,672 | Ivy | Aug. 22, 1944 |
| 2,517,471 | Ewart | Aug. 1, 1950 |
| 2,803,058 | Mead | Aug. 20, 1957 |

FOREIGN PATENTS

| | | |
|---|---|---|
| 522,418 | Italy | Apr. 7, 1955 |